United States Patent
Shimomura et al.

(10) Patent No.: US 12,294,671 B2
(45) Date of Patent: May 6, 2025

(54) MULTIPLE DWELLING HOUSE INTERPHONE SYSTEM

(71) Applicant: Aiphone Co., Ltd., Nagoya (JP)

(72) Inventors: Yuta Shimomura, Nagoya (JP); Masashi Hattori, Nagoya (JP); Kimiaki Fujishima, Nagoya (JP); Ryoji Uno, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 533 days.

(21) Appl. No.: 17/652,752

(22) Filed: Feb. 28, 2022

(65) Prior Publication Data
US 2022/0286563 A1    Sep. 8, 2022

(30) Foreign Application Priority Data
Mar. 2, 2021   (JP) .................................. 2021-032841

(51) Int. Cl.
*H04M 11/02* (2006.01)
*H04M 9/02* (2006.01)
*H04M 11/04* (2006.01)

(52) U.S. Cl.
CPC ........... *H04M 11/025* (2013.01); *H04M 9/02* (2013.01); *H04M 11/04* (2013.01)

(58) Field of Classification Search
CPC ....... H04M 11/025; H04M 9/02; H04M 11/04
See application file for complete search history.

(56) References Cited

U.S. PATENT DOCUMENTS

| | | | |
|---|---|---|---|
| 6,185,294 B1* | 2/2001 | Chornenky | H04M 11/025 379/350 |
| 6,975,230 B1* | 12/2005 | Brilman | A61B 5/1116 340/573.7 |

(Continued)

FOREIGN PATENT DOCUMENTS

| | | |
|---|---|---|
| JP | H05-110699 A | 4/1993 |
| JP | H06-119577 A | 4/1994 |

(Continued)

OTHER PUBLICATIONS

Extended European Search Report dated Jul. 14, 2022 (Application No. 22159255.3).
Japanese Office Action (with English translation) dated Oct. 29, 2024 (Application No. 2021-032841).

*Primary Examiner* — Lisa Hashem
(74) *Attorney, Agent, or Firm* — BURR PATENT LAW, PLLC

(57) ABSTRACT

A multiple dwelling house interphone system include a collective entrance machine, a dwelling room master device, a management master device, and a sensor. When the sensor detects the occurrence of the abnormality, an abnormality occurrence signal is transmitted from the dwelling room master device to the management master device, and the dwelling room master device and the management master device emit emergency alarms. The management master device includes a display section and a display control section. The display control section displays an alarm stop button to stop an emission operation on the display section when the abnormality occurrence signal is received and the emission is started. When the alarm stop button is operated, the display control section subsequently displays an emission source call button to call the dwelling room master device as a transmission source of the abnormality occurrence signal.

4 Claims, 3 Drawing Sheets

(56) References Cited

U.S. PATENT DOCUMENTS

| | | | | |
|---|---|---|---|---|
| 7,015,943 | B2* | 3/2006 | Chiang | G08B 13/19658 |
| | | | | 348/143 |
| 7,400,716 | B1* | 7/2008 | Gibson, Sr. | H04M 1/2476 |
| | | | | 379/167.12 |
| 8,780,201 | B1* | 7/2014 | Scalisi | H04N 7/186 |
| | | | | 348/143 |
| 8,897,433 | B2* | 11/2014 | Mota | H04N 7/186 |
| | | | | 379/167.12 |
| 10,665,072 | B1* | 5/2020 | Fu | G08B 13/19606 |
| 10,810,813 | B1* | 10/2020 | Yang | H04N 7/183 |
| 10,999,561 | B2* | 5/2021 | Child | H04N 7/186 |
| 11,212,427 | B2* | 12/2021 | Jeong | H05K 1/144 |
| 11,256,908 | B2* | 2/2022 | Goulden | G06F 18/22 |
| 2006/0154642 | A1* | 7/2006 | Scannell, Jr. | G08B 21/14 |
| | | | | 455/404.1 |
| 2010/0302042 | A1* | 12/2010 | Barnett | G08B 21/24 |
| | | | | 340/573.1 |
| 2014/0071273 | A1* | 3/2014 | Balthasar | G07C 9/37 |
| | | | | 348/143 |
| 2016/0373909 | A1* | 12/2016 | Rasmussen | H04W 4/80 |

FOREIGN PATENT DOCUMENTS

| | | |
|---|---|---|
| JP | H10-172085 A | 6/1998 |
| JP | H11-213267 A | 8/1999 |
| JP | 2000-113354 A | 4/2000 |
| JP | 2005-191854 A | 7/2005 |
| JP | 2010-056895 A | 3/2010 |
| JP | 2010-252264 A | 11/2010 |
| JP | 2011-008692 A | 1/2011 |
| JP | 2012-115013 A | 6/2012 |
| JP | 2013-042389 A | 2/2013 |

* cited by examiner

MULTIPLE DWELLING HOUSE INTERPHONE SYSTEM

BACKGROUND OF INVENTION

Technical Field

The disclosure relates to a multiple dwelling house interphone system, especially relates to a multiple dwelling house interphone system having a function to notify a manager of an occurrence of abnormality in a dwelling unit.

Background Art

Conventionally, there has been a multiple dwelling house interphone system having a function to notify a manager of an occurrence of abnormality detected in a dwelling unit. For example, JPJ-A-2000-113354 discloses a system in which a security sensor that detects a gas leak and a heat is connected to a dwelling room master device, and when an abnormality is detected, the dwelling room master device of the dwelling unit itself generates an alarm, and additionally, a management master device installed in a manager room also generates an alarm.

JP-A-2010-56895 discloses a system in which a life abnormality sensor that detects an abnormality occurred in a dweller is connected to a dwelling room master device, and an alarm is generated from a management master device in addition to the dwelling room master device when an abnormality is detected.

In the conventional multiple dwelling house interphone system having the function to notify a manager, when the manager makes contact with a dweller as an emission source of the alarm in response to the emission of the alarm, a call is made by operating a management master device to input a dwelling unit number similarly to the ordinary call. When a response is given to the call, while the situation is available through speaking, an additional recording operation is required for recording the speaking to confirm its content later, and therefore, the operation is bothersome.

Therefore, in consideration of the problem, it is an object of the disclosure to provide a multiple dwelling house interphone system that allows calling an emission source of an alarm by a simple operation and further automatically recording a conversation at the time.

SUMMARY OF THE INVENTION

In order to solve the above-described problem, there is provided a multiple dwelling house interphone system according to a first aspect of the disclosure. The multiple dwelling house interphone system includes a collective entrance machine, a dwelling room master device, and a management master device. The collective entrance machine is installed at an entrance of a multiple dwelling house used for calling and speaking with a dweller by a visitor. The dwelling room master device is installed in each dwelling unit of the multiple dwelling house for responding to the call from the collective entrance machine. The management master device is installed in a manager room to speak with the dweller. A sensor that detects an abnormality occurred in the dwelling unit is connected to the dwelling room master device. When the sensor detects the occurrence of the abnormality, an abnormality occurrence signal is transmitted from the dwelling room master device to which the sensor is connected to the management master device, and the dwelling room master device and the management master device emit emergency alarms. The management master device includes a display section and a display control section. The display section displays various kinds of information and includes an operation section formed of a touch panel. The display control section displays an alarm stop button to stop an emission operation on the display section when the abnormality occurrence signal is received and the emission is started. When the alarm stop button is operated, the display control section subsequently displays an emission source call button to call the dwelling room master device as a transmission source of the abnormality occurrence signal.

With this configuration, the operation for calling the transmission source of the abnormality occurrence signal to obtain the situation is performed by simply operating the displayed emission source call button, thus allowing the prompt call by the simple operation.

In a second aspect of the disclosure, which is in the configuration according to the first aspect, the management master device includes an audio storage section that stores an audio of a conversation, and a storing control section that performs a control of storing the audio of the conversation in the audio storage section when a speech path is formed with the dwelling room master device called by an operation of the emission source call button.

With this configuration, the need for the additional recording operation is eliminated since the audio of the conversation with the dweller of the dwelling unit as the transmission source of the abnormality occurrence signal is automatically recorded. Therefore, the manager can concentrate on the conversation.

In a third aspect of the disclosure, which is in the configuration according to the first aspect, the emission source call button displayed on the display section is displayed together with information on the dwelling unit that is a calling destination and the transmission source of the abnormality occurrence signal.

With this configuration, the manager performing the calling operation easily obtains the calling destination since the dwelling unit information is displayed together with the emission source call button when calling the transmission source of the abnormality occurrence signal.

According to the disclosure, the operation for calling the emission source of the emergency alarm to obtain the situation is performed by simply operating the displayed emission source call button, thus allowing the prompt call by the simple operation. The need for the additional recording operation is eliminated since the audio of the conversation with the dweller of the dwelling unit as the emission source of the emergency alarm is automatically recorded. Therefore, the manager can concentrate on the conversation.

DETAILED DESCRIPTION

Figure 1:
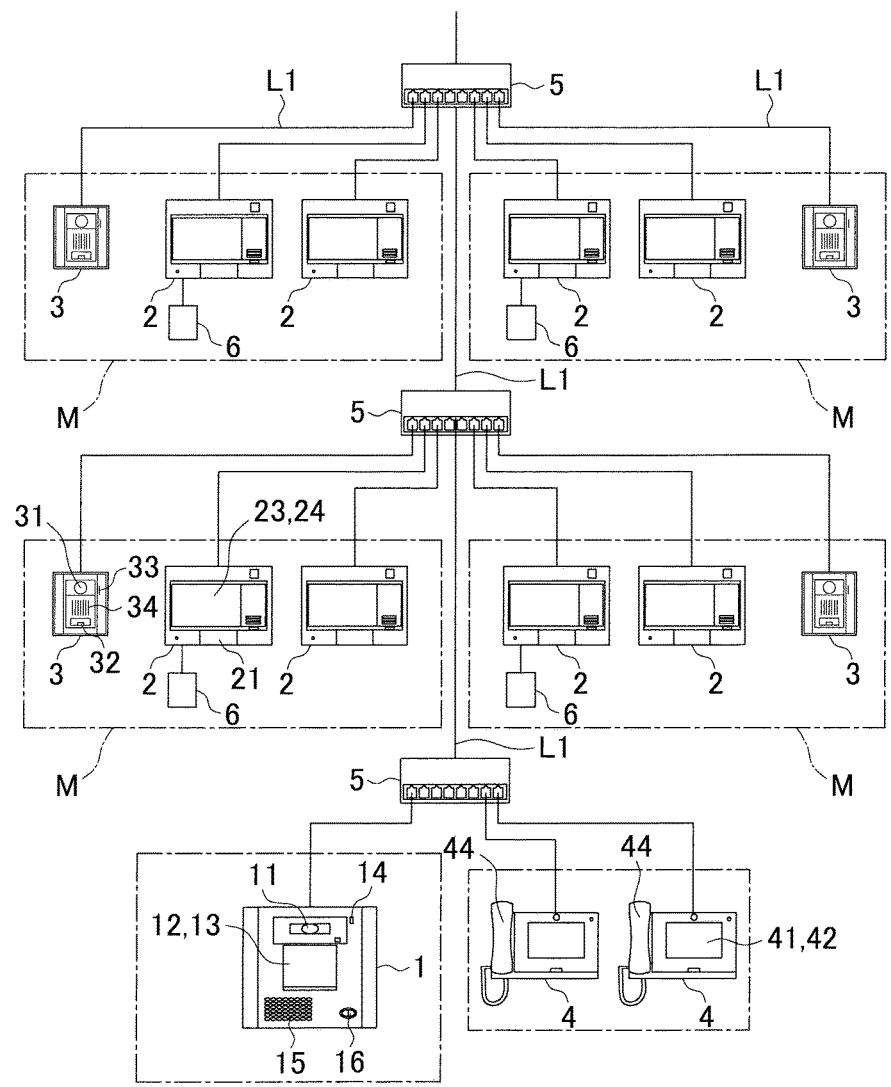
FIG. 1 is a block diagram illustrating an exemplary multiple dwelling house interphone system according to the disclosure.

The following describes embodiments in detail with reference to the drawings. FIG. 1 is a block diagram illustrating an exemplary multiple dwelling house interphone system according to the disclosure. In FIG. 1, reference character 1 denotes a collective entrance machine installed at an entrance of a multiple dwelling house and used for calling a dweller by a visitor. Reference characters 2 denote dwelling room master devices installed in individual dwelling units and used for responding the call from the collective entrance machine 1. Reference characters 3 denote entrance slave devices installed at entrances of the individual dwelling units and used for calling the dweller. Reference characters 4 denote management master devices installed in a manager room and used for speaking with the visitor and the dweller. Reference characters 6 denote sensors, such as a fire sensor, to detect an occurrence of an abnormality, and the sensor is connected to the dwelling room master device 2 of the each dwelling unit in which the sensor is installed.

Reference characters 5 denote HUBs, the devices are mutually connected by a LAN via communication lines L1, and the communication between the devices are performed by an Internet Protocol (IP). By performing the communication between the devices by the IP, adding the dwelling room master device 2 and the like is facilitated. A configuration in which the two dwelling room master devices 2 are installed in each dwelling unit is illustrated. Reference characters M indicate dwelling units, and the sensor 6 is installed for each dwelling unit M.

The collective entrance machine 1 includes a camera 11, an operation section 12, a display section 13, a microphone 14 and a speaker 15, a call button 16, and the like. The camera 11 obtains an image of a visitor. The operation section 12 is used for selecting or inputting a dwelling unit to be called. The display section 13 displays a calling destination and the like. The microphone 14 and the speaker 15 are used for speaking. The operation section 12 includes a touch panel, and is integrated with the display section 13.

The dwelling room master device 2 includes a speech button 21, a speech section (not illustrated), a monitor 23, an operation section 24, and the like. The speech button 21 is used for a response operation to the calling. The speech section (not illustrated) includes a microphone and a speaker for speaking. The monitor 23 includes an LCD that displays a video image obtained by the camera 11 and various kinds of information. The operation section 24 includes a touch panel integrally formed with the monitor 23.

The entrance slave device 3 includes a slave device camera 31 for obtaining an image of a visitor, a call button 32, a microphone 33 and a speaker 34 used for speaking, and the like.

Figure 2:
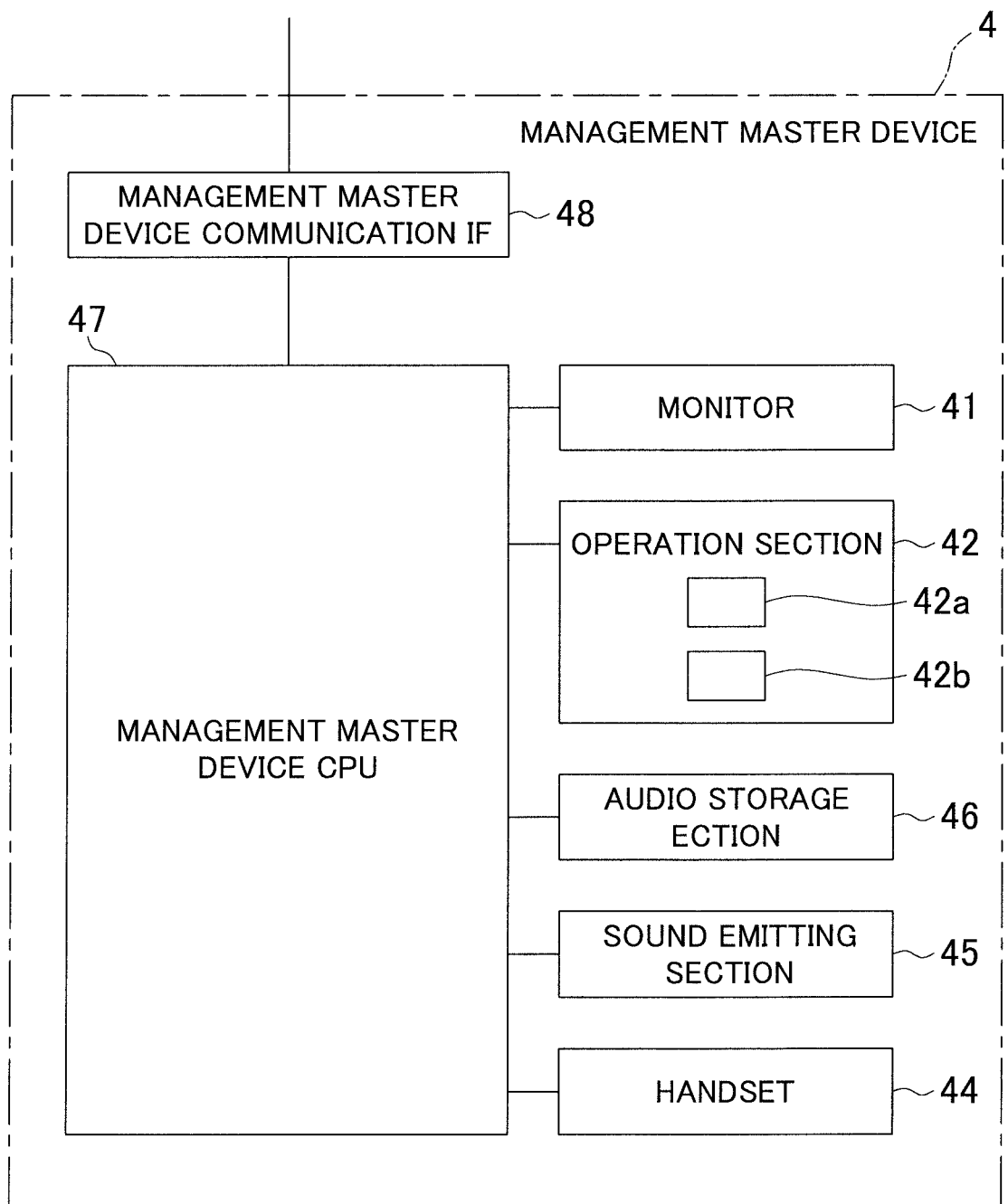
FIG. 2 is a function block diagram of a management master device.

FIG. 2 is a block diagram of the management master device 4. As illustrated in FIG. 2, the management master device 4 includes a monitor 41, an operation section 42, a handset 44, a sound emitting section 45, an audio storage section 46, a management master device CPU 47, a management master device communication IF 48, and the like. The monitor 41 includes an LCD that displays a video image obtained by the camera 11 and displays various kinds of information. The operation section 42 includes a touch panel integrally formed with the monitor 41. The handset 44 is used for speaking. The sound emitting section 45 emits a warning sound and an amplified sound. The audio storage section 46 stores an audio of a conversation. The management master device CPU 47 controls the management master device 4. The management master device communication IF 48 communicates with the dwelling room master device 2 and the like via the communication line L1.

The following describes operations of the multiple dwelling house interphone system configured as described above. It should be noted that, an emission operation in association with a detection operation of the sensor 6 is mainly described here, and explanations of basic operations, such as a call by a visitor, a response to it by a dweller, and displaying a video image of the visitor taken by the camera 11, are omitted.

When the sensor 6 detects an occurrence of an abnormality, the dwelling room master device 2 recognizes it and starts an emergency alarm emission operation to make a warning sound, and the monitor 23 displays that the emergency alarm is generated. The monitor 23 simultaneously displays an alarm stop button (not illustrated), and the warning sound is stopped by operating the button. The emergency alarm displayed on the monitor 23 may be a specific content, and for example, a display indicating an occurrence of fire may be performed when a sensing operation is performed by the fire sensor.

The dwelling room master device 2 that has started the emergency alarm emission operation transmits an abnormality occurrence signal to the management master device 4. The management master device 4 receiving the signal performs the emergency alarm emission operation similarly to the dwelling room master device 2 by the control of the management master device CPU 47. Specifically, a warning sound is emitted, and the monitor 41 displays the generation of the emergency alarm.

Figure 3A:
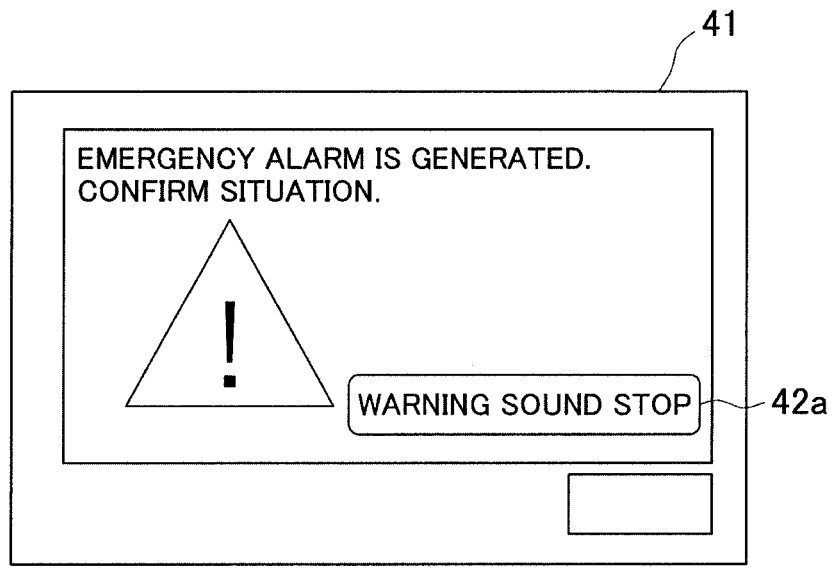
FIG. 3A is an explanatory drawing of a display of the management master device that has received an abnormality occurrence signal, and illustrates a first display.
Figure 3B:
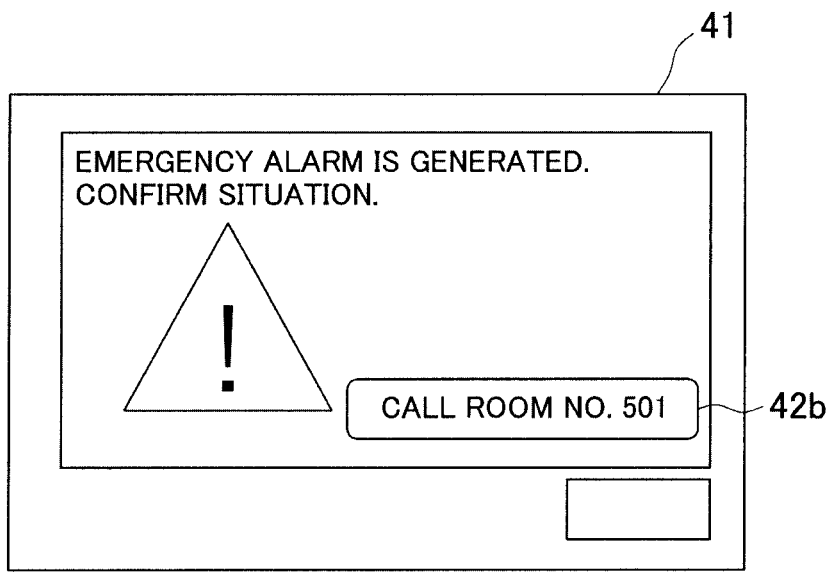
FIG. 3B is an explanatory drawing of the display of the management master device that has received the abnormality occurrence signal, and illustrates a display after an alarm emission is stopped.

FIGS. 3A and 3B illustrate displays of the monitor 41 of the management master device 4 that has received the abnormality occurrence signal. FIG. 3A illustrates a first display, and FIG. 3B illustrates a display after the alarm emission is stopped. As illustrated in FIGS. 3A and 3B, a display indicating the generation of the emergency alarm is performed in response to the abnormality occurrence signal, and a warning sound stop button 42a is displayed together. When the stop button 42a is operated (touched), the warning sound of the management master device 4 is stopped, and the display of the monitor 41 is switched to that of FIG. 3B.

In FIG. 3B, an emission source call button 42b is displayed, and a dwelling unit number of a transmission source of the abnormality occurrence signal is displayed together. The management master device CPU 47 reads information on the dwelling unit as the signal transmission source from the abnormality occurrence signal transmitted from the dwelling room master device 2, and the dwelling unit number as the dwelling unit information is displayed together with the emission source call button 42b.

When the emission source call button 42b is touched, a call signal is generated and transmitted to the dwelling room master device 2 of the dwelling unit as the transmission source of the abnormality occurrence signal.

Thus, when the response operation is performed by the dwelling room master device 2 that has received the call signal and started calling, a speech path with the management master device 4 is formed, and speaking between the manager and the dweller is allowed.

When the speech path is formed, the management master device CPU 47 that has recognized it starts to perform a control of storing the audio of the conversation in the audio storage section 46. The stored audio is played back by a predetermined playback operation of the management master device 4.

As described above, the operation for calling the transmission source of the abnormality occurrence signal to obtain the situation is performed by simply operating the displayed emission source call button 42b, thus allowing the prompt call by the simple operation.

Since the audio of the conversation with the dweller as the transmission source of the abnormality occurrence signal is automatically recorded, the need for the additional recording operation is eliminated, thus allowing the manager to concentrate on the conversation.

Further, the manager performing the calling operation easily obtains the calling destination since the dwelling unit information is displayed together with the emission source call button 42b when calling the transmission source of the abnormality occurrence signal.

While one sensor 6 is installed for each dwelling unit in the above-described embodiment, the sensor 6 may include various sensors, such as a gas sensor and a life abnormality sensor detecting an abnormality of a dweller, in addition to the fire sensor. By transmitting respective signals to the dwelling room master device 2 of the dwelling unit at which the sensors are installed, the multiple dwelling house interphone system of the disclosure can be configured.

While the multiple dwelling house interphone system has a configuration in which the communication between the devices is performed by the IP communication, the technique of the disclosure is applicable to a conventional configuration in which a controller to control the communication between the devices is disposed and the devices are mutually connected by a two-wire transmission line.

The invention claimed is:

1. A multiple dwelling house interphone system comprising:
   a collective entrance machine installed at an entrance of a multiple dwelling house used for calling and speaking with a dweller by a visitor;
   a dwelling room master device installed in each dwelling unit of the multiple dwelling house for responding to the call from the collective entrance machine; and
   a management master device installed in a manager room to speak with the dweller in each dwelling unit,
   wherein a sensor, comprising at least one of an environmental condition sensor and a dweller biometric life sensor, detects an occurrence of an abnormality in environmental conditions in one of the dwelling units or biometric conditions of the dweller in one of the dwelling units, and wherein the sensor is connected to each dwelling room master device,
   wherein when the sensor detects the occurrence of the abnormality in one of the dwelling units, an abnormality occurrence signal is transmitted from one of the dwelling room master devices to which the sensor that detected the abnormality in one of the dwelling units is connected to the management master device, and wherein one of the dwelling room master devices and the management master device emit emergency alarms,
   wherein the management master device includes
      a display section that displays various kinds of information and includes an operation section formed of a touch panel, and
      a display control section that displays an alarm stop button to stop an emission operation on the display section when the abnormality occurrence signal is received and the emission operation is started, and
   wherein when the alarm stop button is operated, the display control section subsequently displays an emission source call button to call tone of the dwelling room master devices from which the abnormality occurrence signal was transmitted.

2. The multiple dwelling house interphone system according to claim 1, wherein the management master device includes an audio storage section that stores an audio of a conversation, and a storing control section that performs a control of storing the audio of the conversation in the audio storage section when a speech path is formed with one of the dwelling room master devices that is called by an operation of the emission source call button.

3. The multiple dwelling house interphone system according to claim 2, wherein the emission source call button displayed on the display section is displayed together with information on one of the dwelling units that is a calling destination and the transmission source of the abnormality occurrence signal.

4. The multiple dwelling house interphone system according to claim 1, wherein the emission source call button displayed on the display section is displayed together with information on one of the dwelling units that is a calling destination and the transmission source of the abnormality occurrence signal.

* * * * *